United States Patent
Chen

(10) Patent No.: US 10,224,823 B2
(45) Date of Patent: Mar. 5, 2019

(54) INTEGRATED CIRCUIT FOR SWITCHING CONVERTER AND METHOD FOR PROVIDING POWER SUPPLY VOLTAGE TO THE SAME

(71) Applicant: Chengdu Monolithic Power Systems Co., Ltd., Chengdu (CN)

(72) Inventor: Yuedong Chen, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

(21) Appl. No.: 15/665,354

(22) Filed: Jul. 31, 2017

(65) Prior Publication Data
US 2018/0034380 A1 Feb. 1, 2018

(30) Foreign Application Priority Data
Aug. 1, 2016 (CN) .......................... 2016 1 0622701

(51) Int. Cl.
| | |
|---|---|
| *H02M 3/335* | (2006.01) |
| *H02M 1/32* | (2007.01) |
| *H02M 1/36* | (2007.01) |
| *H02M 1/42* | (2007.01) |
| *H02M 1/00* | (2006.01) |

(52) U.S. Cl.
CPC ......... *H02M 3/33523* (2013.01); *H02M 1/32* (2013.01); *H02M 1/36* (2013.01); *H02M 1/4258* (2013.01); *H02M 2001/0006* (2013.01)

(58) Field of Classification Search
CPC .................................. H02M 1/32; H02M 1/36
USPC ........ 363/21.04–21.18, 49, 55, 56.01, 56.05, 363/56.09, 56.11
See application file for complete search history.

(56) References Cited

U.S. PATENT DOCUMENTS

| | | | | |
|---|---|---|---|---|
| 2009/0268488 | A1* | 10/2009 | Fujii | H02M 1/32 363/49 |
| 2010/0214807 | A1 | 8/2010 | Li | |
| 2011/0204866 | A1* | 8/2011 | Moon | H02M 1/36 323/284 |
| 2012/0033465 | A1* | 2/2012 | Lee | H02M 3/33507 363/53 |
| 2013/0077353 | A1 | 3/2013 | Kuang et al. | |
| 2013/0242626 | A1* | 9/2013 | Li | H02M 1/36 363/50 |

(Continued)

FOREIGN PATENT DOCUMENTS

JP 2006204082 A * 8/2006

*Primary Examiner* — Alex Torres-Rivera
(74) *Attorney, Agent, or Firm* — Perkins Coie LLP

(57) ABSTRACT

An integrated circuit used for a switching converter has a power supply circuit for providing a power supply voltage, and a control circuit. The switching converter has a switching circuit converting a DC input voltage into an output signal. The power supply circuit has a protection circuit, an UVLO unit and a current source coupled to a power supply capacitor. The protection circuit detects whether the DC input voltage is at a brown-in state. The UVLO unit generates a lock out signal by comparing the power supply voltage with a upper threshold voltage and a lower threshold voltage. The lower threshold voltage is selectively limited to one of a first value or a second value based on the detection. The second value is less than the first value. The current source provides the power supply voltage under the control of the lock out signal.

18 Claims, 7 Drawing Sheets

(56) References Cited

U.S. PATENT DOCUMENTS

| | | | |
|---|---|---|---|
| 2014/0062333 A1* | 3/2014 | Sonobe | H05B 33/0815 315/291 |
| 2016/0156171 A1* | 6/2016 | Xiao | H02M 1/32 361/18 |
| 2016/0241149 A1* | 8/2016 | Chen | H02M 1/36 |

* cited by examiner

INTEGRATED CIRCUIT FOR SWITCHING CONVERTER AND METHOD FOR PROVIDING POWER SUPPLY VOLTAGE TO THE SAME

CROSS-REFERENCE TO RELATED APPLICATIONS

This application claims the benefit of CN application 201610622701.8, filed on Aug. 1, 2016, and incorporated herein by reference.

TECHNICAL FIELD

The present invention generally relates to electronic circuits, and more particularly but not exclusively to integrated circuits for switching converter and methods for providing a power supply voltage to the same.

BACKGROUND

Switching converters are widely used to convert an input signal into an output signal through the ON and OFF switching of switches. A controller needing a DC power supply voltage, such as a control IC, is generally used to control the switches in the switching converter. When the switching converter is just started up, there needs some time (startup time) to establish the power supply voltage. During the startup time, the switching converter cannot work normally.

FIG. 1 illustrates a prior switching converter. A rectifier bridge is used to convert an AC input voltage $V_{AC}$ into a DC input voltage $V_{DC}$ at an output terminal. The switching converter comprising a switching circuit with a transformer T1, a switch M, a diode $D_{out}$ and an output capacitor $C_{out}$ converts the DC input voltage $V_{DC}$ into an output signal to drive a load. One terminal of a current source IS is coupled to the output terminal of the rectifier bridge. A capacitor C1 is coupled between the other terminal of the current source IS and the ground. A voltage across the capacitor C1 is used as a power supply voltage $V_{CC}$ of the control IC. A controller 101 is used to control the ON and OFF switching of the switch M. Internal components and circuit blocks in the controller 101 can be powered by the power supply voltage $V_{CC}$.

FIG. 2 illustrates a waveform of the power supply voltage $V_{CC}$ during startup of the switching converter shown in FIG. 1. When the switching converter just starts up, the power supply voltage $V_{CC}$ has not been built up, the DC input voltage $V_{DC}$ is configured to charge the capacitor C1 through the current source IS, and the power supply voltage $V_{CC}$ is gradually increased. When the power supply voltage $V_{CC}$ is increased to reach a upper threshold voltage $IS_{OFF}$ at time t1, a hysteresis comparison signal LOCK from a hysteresis comparator COM is changed from logical low into logical high. The current source IS is turned OFF. At time t2, the power supply voltage $V_{CC}$ gradually decreases to a lower threshold voltage $IS_{ON}$ since no operation of the switching circuit have begun. The hysteresis comparison signal LOCK is changed from logical high into logical low, and then the current source IS is turned ON and is configured to charge the capacitor C1 again. At time t3, the switching converter enters into normal operation, and instead of the current source IS, the auxiliary winding of the transformer T1 is used to provide power to the control IC through a diode D1.

In most applications, the DC input voltage $V_{DC}$ is not constant. If the DC input voltage $V_{DC}$ is too low, the switching converter won't work normally. In order to avoid this, a brown-in voltage setting of the DC input voltage $V_{DC}$ is important to prevent the switching converter from an abnormal brown-out operation. Generally, the controller 101 will be started when the DC input voltage $V_{DC}$ increases to higher than a brown-in threshold voltage $V_{BI}$, and the controller 101 is disabled when the DC input voltage $V_{DC}$ decreases to less than a brown-out threshold voltage $V_{BO}$, thus assuring that the switching converter is operated at a normal voltage range of the DC input voltage $V_{DC}$.

However, the present inventor has recognized that if the startup of the controller 101 happens when the power supply voltage $V_{CC}$ decreases to approach the lower threshold voltage $IS_{ON}$, the internal components and/or circuit blocks in the controller 101 will suddenly consume a very high peak current, accordingly, the power supply voltage $V_{CC}$ cannot provide enough energy to make the switching converter enter into normal operation, thereby causing the startup failure which is undesirable.

SUMMARY

Embodiments of the present invention are directed to an integrated circuit for a switching converter, the switching converter comprises a switching circuit and a power supply capacitor configured to provide a power supply voltage for the integrated circuit, the switching circuit having at least one switch is configured to convert a DC input voltage into an output signal through the ON and OFF switching of the at least one switch, the integrated circuit comprises a power supply circuit and a control circuit. The power supply circuit coupled to the power supply capacitor and configured to provide the power supply voltage comprises a protection circuit, an UVLO unit and a current source. The protection circuit is configured to detect whether the DC input voltage is at a brown-in state and has an output terminal configured to generate a flag signal based on the detection. The UVLO unit has a first input terminal coupled to receive the power supply voltage, a second input terminal coupled to receive the flag signal, and an output terminal configured to generate a lock out signal by comparing the power supply voltage with a upper threshold voltage and a lower threshold voltage, wherein the flag signal is used to selectively limit the lower threshold voltage of the power supply voltage to one of a first value or a second value, wherein the second value is less than the first value. The current source has an input terminal coupled to the DC input voltage, an output terminal coupled to the power supply capacitor to provide the power supply voltage, and a control terminal coupled to the output terminal of the UVLO unit. The control circuit is coupled to the output terminal of the protection circuit and the at least one switch and is configured to generate a control signal to control the at least one switch.

BRIEF DESCRIPTION OF THE DRAWING

The present invention can be further understood with reference to the following detailed description and the appended drawings, wherein like elements are provided with like reference numerals.

DETAILED DESCRIPTION

Various embodiments of the technology will now be described. In the following description, some specific details, such as example circuits and example values for these circuit components, devices or process, are included to provide a thorough understanding of embodiments. One skilled in the relevant art will recognize, however, that the technology can be practiced without one or more specific details, or with other methods components, materials, etc.

Throughout the specification, the terms "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. Moreover, the drawings are only for illustration purpose. Usually, these drawings are not necessarily drawn to scale. Persons of ordinary skill in the art will appreciate that the terms "coupled" or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Figure 1:
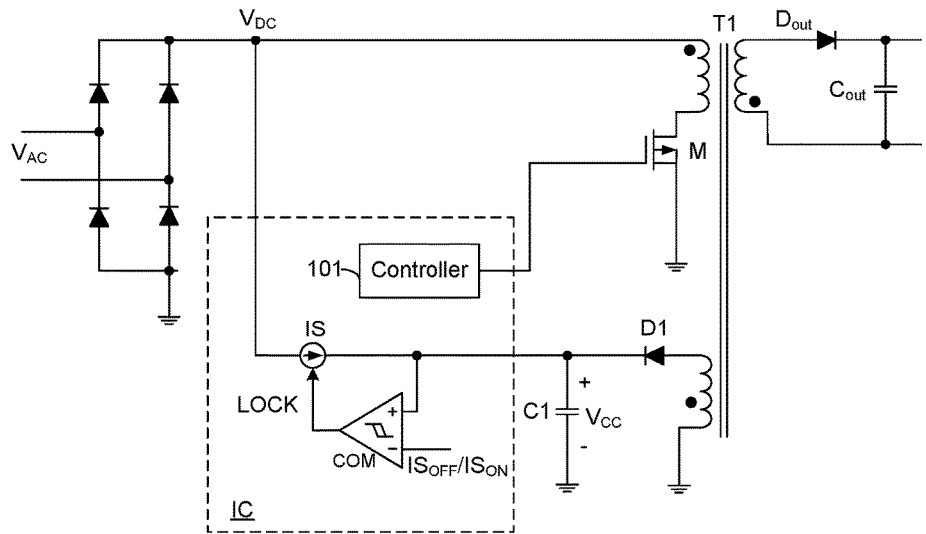
FIG. 1 illustrates a prior switching converter.
Figure 2:
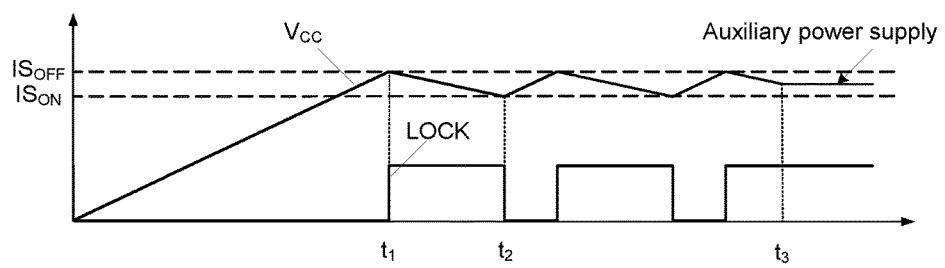
FIG. 2 illustrates a waveform of the power supply voltage $V_{CC}$ during startup of the switching converter shown in FIG. 1.
Figure 3:
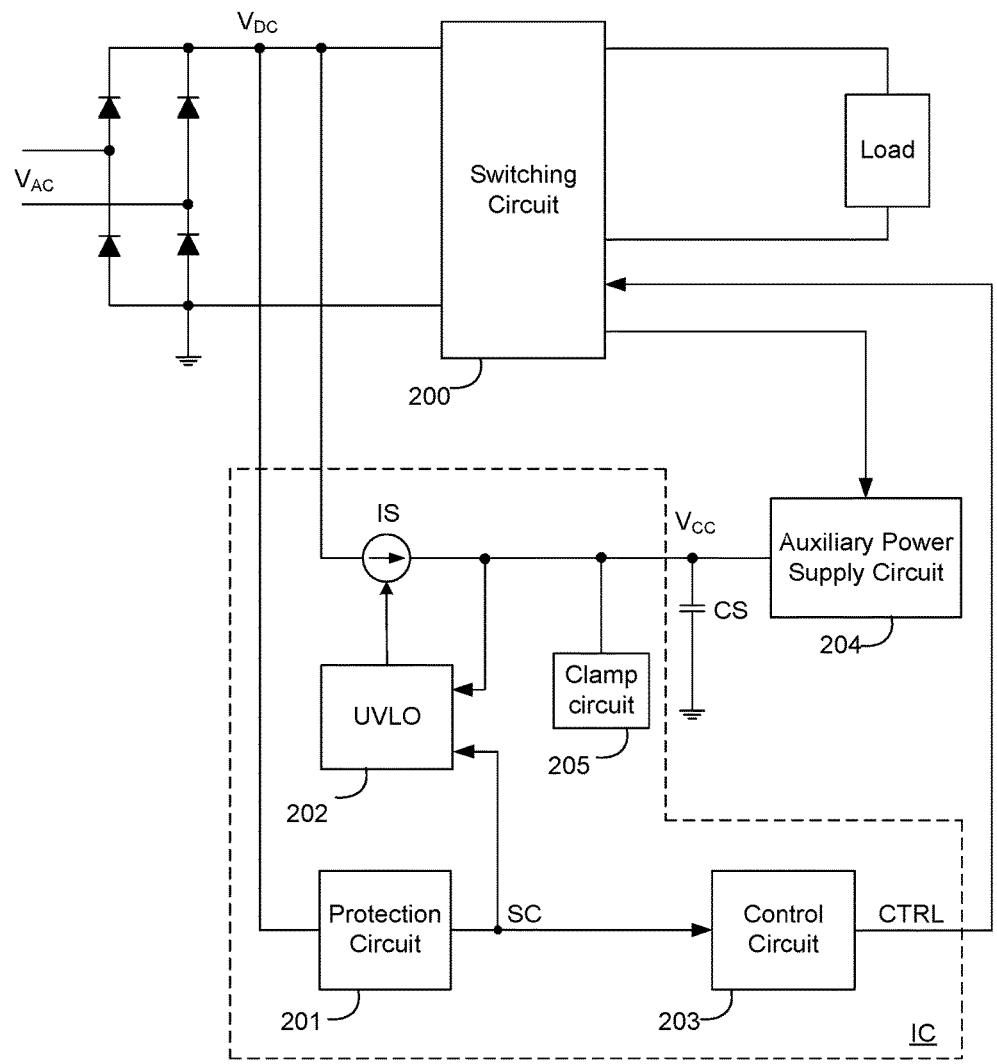
FIG. 3 illustrates a block diagram of a switching converter, in accordance with an embodiment of the present invention.

FIG. 3 illustrates a block diagram of a switching converter, in accordance with an embodiment of the present invention. A diode rectifying bridge receives and rectifies an AC input voltage $V_{AC}$, and outputs a DC input voltage $V_{DC}$. The switching converter comprises a switching circuit 200 having an input terminal coupled to receive the DC input voltage $V_{DC}$ and an output terminal. In one embodiment, the DC input voltage $V_{DC}$ can be received from a power factor correction (PFC) circuit. One of ordinary skill in the art will appreciate that other circuits may also be used to provide the DC input voltage without detracting from the merits of the present invention. The switching circuit 200 comprises at least one switch and converts the DC input voltage $V_{DC}$ into an output signal for a load through an ON and OFF switching of the at least one switch. Switching circuit 200 may adopt any direct current to direct current (DC/DC) circuit and altering current to direct current (AC/DC) topology, such as step-up converter, step-down converter, forward converter, flyback converter and LLC resonant converter and so on. The switch in the switching circuit 200 may be any controllable semiconductor devices, such as MOSFET (metal oxide semiconductor field effect transistor), IGBT (isolated gate bipolar transistor) and so on.

In one embodiment, a power supply circuit and a control circuit 203 are integrated in an integrated circuit (IC), such as a control IC. A first terminal of a power supply capacitor CS is coupled to the control IC used for the switching converter and is configured to provide a power supply voltage $V_{CC}$ for the control IC. A second terminal of the power supply capacitor CS is coupled to ground.

The power supply circuit is coupled to the power supply capacitor CS and is configured to provide the power supply voltage $V_{CC}$. The power supply circuit comprises a protection circuit 201, a under voltage lock out (UVLO) unit 202 and a current source IS. As shown in FIG. 3, the protection circuit 201 has an input terminal coupled to the input terminal of the switching circuit 200 to receive the DC input voltage $V_{DC}$, and an output terminal. The protection circuit 201 is configured to detect whether the DC input voltage $V_{DC}$ is at a brown-in state and generates a flag signal SC at the output terminal based on the detection condition.

The UVLO unit 202 has a first input terminal coupled to the first terminal of the power supply capacitor CS to receive the power supply voltage $V_{CC}$, a second input terminal coupled to the output terminal of the protection circuit 201 to receive the flag signal SC, and an output terminal configured to generate a lock out signal LOCK by comparing the power supply voltage $V_{CC}$ with a upper threshold voltage $IS_{OFF}$ and a lower threshold voltage $IS_{ON}$. The flag signal SC is used to selectively limit the lower threshold voltage $IS_{ON}$ of the power supply voltage $V_{CC}$ to one of a first value $IS_{ON1}$ or a second value $IS_{ON2}$. The second value $IS_{ON2}$ is less than the first value $IS_{ON1}$.

The current source IS has an input terminal coupled to receive the DC input voltage $V_{DC}$, an output terminal coupled to the first terminal of the power supply capacitor CS to provide the power supply voltage $V_{CC}$, and a control terminal coupled to the output terminal of the UVLO unit 202 to receive the lock out signal LOCK. The lock out signal LOCK is configured to control the turning-ON and turning-OFF of the current source IS.

When the switching converter just starts up, the power supply voltage $V_{CC}$ has not been built up and the switching circuit 200 is not in normal operation. The current source IS is turned ON, and the DC input voltage $V_{DC}$ is used to provide energy to the power supply capacitor CS through the current source IS, and the power supply voltage $V_{CC}$ is increased gradually. When the power supply voltage $V_{CC}$ is increased to reach the upper threshold voltage $IS_{OFF}$, the lock out signal LOCK is changed from a first logic state to a second logic state, and the current source IS is turned OFF. Afterwards, the protection circuit 201 is used to detect whether the DC input voltage $V_{DC}$ is at the brown-in state and generates the flag signal SC based on the detection condition.

In one embodiment, the protection circuit 201 is configured to detect whether the DC input voltage $V_{DC}$ is at the brown-in state based on the DC input voltage $V_{DC}$, a brown-in threshold voltage $V_{BI}$ and a brown-out threshold voltage $V_{BO}$. When the DC input voltage $V_{DC}$ is increased to higher than or equal to the brown-in threshold voltage $V_{BI}$, the flag signal SC is changed from a first logic state to a second logic state, the DC input voltage $V_{DC}$ enters into the brown-in state. When the DC input voltage $V_{DC}$ is decreased to less than or equal to the brown-out threshold voltage $V_{BO}$, the flag signal SC is changed from the second logic state to the first logic state, the DC input voltage $V_{DC}$ exits the brown-in state.

When the DC input voltage $V_{DC}$ is not at the brown-in state, the flag signal SC is configured to select the first value $IS_{ON1}$ (e.g. 15V) as the lower threshold voltage $IS_{ON}$ of the power supply voltage $V_{CC}$. When the DC input voltage VDC is at the brown-in state, the flag signal SC is configured to change the lower threshold voltage $IS_{ON}$ of the power supply voltage $V_{CC}$ from the first value $IS_{ON1}$ to the second value $IS_{ON2}$ (e.g. 11.5V).

In one embodiment, when the power supply voltage $V_{CC}$ decreases to the lower threshold voltage $IS_{ON}$, the current source IS is turned ON to charge the power supply capacitor CS again.

The control circuit 203 is coupled to the output terminal of the protection circuit 201 and the at least one switch of the switching circuit 200 and is configured to generate a control signal to control the ON and OFF switching of the at least one switch. The flag signal SC is further configured and the control circuit 203 is disabled. In detail, when the DC input voltage $V_{DC}$ is not at the brown-in state, the flag signal SC is at the first logic state to disable the control circuit 203. When the DC input voltage $V_{DC}$ is at the brown-in state, the flag signal SC is at the second state and the control circuit 203 is enabled, and then the control circuit 203 starts up and starts to generate a control signal for the at least one switch of the switching circuit 200.

As described in the prior art, the present inventor has recognized that if the startup of the control circuit 203 happens when the power supply voltage $V_{CC}$ decreases to approach the lower threshold voltage $IS_{ON}$, the internal components and/or circuit blocks in the control circuit 203 will suddenly consume a very high peak current, accordingly, the power supply voltage $V_{CC}$ cannot provide enough energy to make the switching converter 200 enter into the normal operation, thereby causing the startup failure. To solve the problem mentioned above, a difference between the first value $IS_{ON1}$ and the second value $IS_{ON2}$ can be configured and adjusted to provide enough energy which is saved on the power supply capacitor CS, it will promise the startup of the switching converter can be finished successfully when the control circuit 203 just start to work, and the start failure is prevented. Whenever the brown-in happens and the control circuit 203 starts up, there is always at least $C*(IS_{ON1}-IS_{ON2})$ charge saved on the power supply capacitor CS to support the startup, wherein C is the capacitance of the power supply capacitor CS.

In one embodiment, the switching converter further comprises a clamp circuit 205 coupled to the first terminal of the power supply capacitor CS. The clamp circuit 205 limits the maximum of the power supply voltage $V_{CC}$ to a clamp threshold voltage, such as 18V.

In one embodiment, the switching converter further comprises an auxiliary power supply circuit 204. The auxiliary power supply circuit 204 has an input terminal and an output terminal, wherein the input terminal is electrically or magnetically coupled to the output terminal of the switching circuit 200, and the output terminal is coupled to the first terminal of the power supply capacitor CS. When the switching converter just starts up, the power supply voltage $V_{CC}$ has not been built up and the switching circuit 200 is not in normal operation. The current source IS is used to provide energy for the power supply capacitor CS. After the startup of the switching converter has been finished, the switching circuit 200 starts to work. The auxiliary power supply circuit 204 is mainly used to provide energy to the power supply capacitor CS instead of the current source IS.

Figure 4:
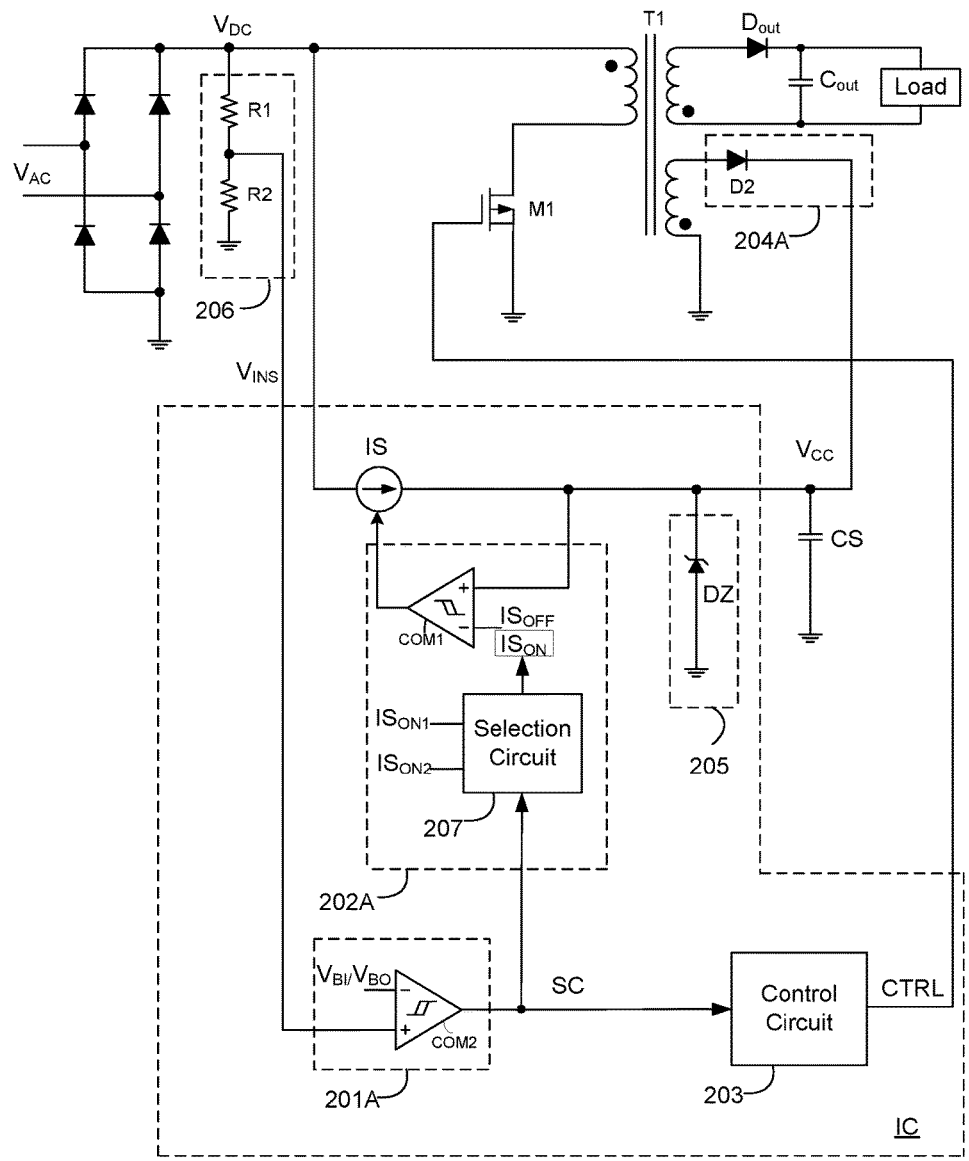
FIG. 4 schematically illustrates a switching converter in accordance with an embodiment of the present invention.

FIG. 4 schematically illustrates a switching converter in accordance with an embodiment of the present invention. As shown in FIG. 4, a rectifying bridge has an input terminal configured to receive an AC voltage $V_{AC}$ inputted from a power grid and an output terminal configured to output a DC input voltage $V_{DC}$. The switching converter comprises a switching circuit 200 having an input terminal coupled to the output terminal of the rectifying bridge to receive the DC input voltage $V_{DC}$ and an output terminal. The switching circuit 200 comprises a transformer T1, a switch M, a diode $D_{out}$ and an output capacitor $C_{out}$ and converts the DC input voltage $V_{DC}$ into an output signal to drive a load through the ON and OFF switching of the switch M. A first terminal of a power supply capacitor CS is coupled to a control IC used for the switching converter to provide a power supply voltage $V_{CC}$. A second terminal of the power supply capacitor CS is coupled to ground. The control IC comprises a power supply circuit and a control circuit 203.

In the embodiment shown in FIG. 4, the power supply circuit comprises a protection circuit 201A, a UVLO unit 202A, a current source IS and an input voltage dividing circuit 206.

The input voltage dividing circuit 206 comprises a resistor divider which is composed of a resistor R1 and a resistor R2. The resistor divider is coupled to the input terminal of the switching circuit 200 to receive the DC input voltage $V_{DC}$ and has an output terminal configured to generate a voltage sensing signal $V_{INS}$.

The input voltage dividing circuit 206 is set forth in order to convert the DC input voltage $V_{DC}$ with high voltage into the voltage sensing signal $V_{INS}$ with low voltage for further process. It will be obvious to one of ordinary skill in the art that the present invention may be practiced without the input voltage dividing circuit 206.

In the embodiment shown in FIG. 4, the protection circuit 201A comprises a hysteresis comparator COM2. The hysteresis comparator COM2 has a non-inverting input terminal, an inverting input terminal and an output terminal, wherein the non-inverting input terminal is coupled to receive the voltage sensing signal $V_{INS}$, the inverting input terminal is coupled to receive a brown-in threshold voltage $V_{BI}$ and a brown-out threshold voltage $V_{BO}$, and the output terminal is configured to provide the flag signal SC based on the input voltage sensing signal $V_{INS}$, the brown-in threshold voltage $V_{BI}$ and the brown-out threshold voltage $V_{BO}$. When the voltage sensing signal $V_{INS}$ is increased to reach the brown-in threshold voltage $V_{BI}$, the flag signal SC is changed from a first logic state to a second logic state. And the DC input voltage $V_{DC}$ enters the brown-in state. When the voltage sensing signal $V_{INS}$ is decreased to reach the brown-out threshold voltage $V_{BO}$, the DC input voltage $V_{DC}$ exits the brown-in state, the flag signal SC is changed from the second logic state to the first logic state. In another embodiment, the protection circuit 201A may comprise a plurality of comparators and logic gate circuits.

Even though particular elements of the protection circuit 201A are shown in FIG. 4, in other embodiments, the protection circuit 201A may further include other elements with other protection function, for example, an over-voltage protection or an overload protection, to provide a flag signal SC.

In one embodiment, the brown-in threshold voltage $V_{BI}$ and the brown-out threshold voltage $V_{BO}$ can be set by a graphic user interface (GUI).

In the embodiment of FIG. 4, the UVLO unit 202A comprises a selection circuit 207 and a hysteresis comparator COM1. The selection circuit 207 has an input terminal coupled to receive the flag signal SC, the selection circuit 207 is configured to select one of the first value $IS_{ON1}$ and the second value $IS_{ON2}$ as the lower threshold voltage of the power supply voltage $V_{CC}$ based on the flag signal SC. The hysteresis comparator COM1 has a non-inverting input terminal, an inverting input terminal and an output terminal, wherein the non-inverting input terminal is coupled to the first terminal of the power supply capacitor CS to receive the power supply voltage $V_{CC}$, the inverting input terminal is coupled to receive the upper threshold voltage $IS_{OFF}$ and the lower threshold voltage $IS_{ON}$ selected by the selection circuit 207, and the output terminal is configured to provide the lock out signal LOCK to control the turning-ON and turning-OFF of the current source IS. In another embodiment, the UVLO unit 202A may comprise a plurality of comparators and logic gate circuits.

In one embodiment, the switching converter further comprises a clamp circuit 205. The clamp circuit 205 comprises a zener diode DZ. The zener diode DZ has a first terminal coupled to the first terminal of the power supply capacitor CS and a second terminal coupled to ground. In other embodiments, the clamp circuit 205 may comprise other suitable elements.

In one embodiment, the switching converter further comprises an auxiliary power supply circuit 204A. The auxiliary power supply circuit 204A comprises a diode D2. The anode of the diode D2 is coupled to the auxiliary winding of the transformer T1, the cathode of the diode D2 is coupled to the first terminal of the power supply capacitor CS. In one embodiment, the auxiliary power supply circuit 204A further comprises a resistor coupled between the auxiliary winding and the anode of the diode D2.

Figure 5:
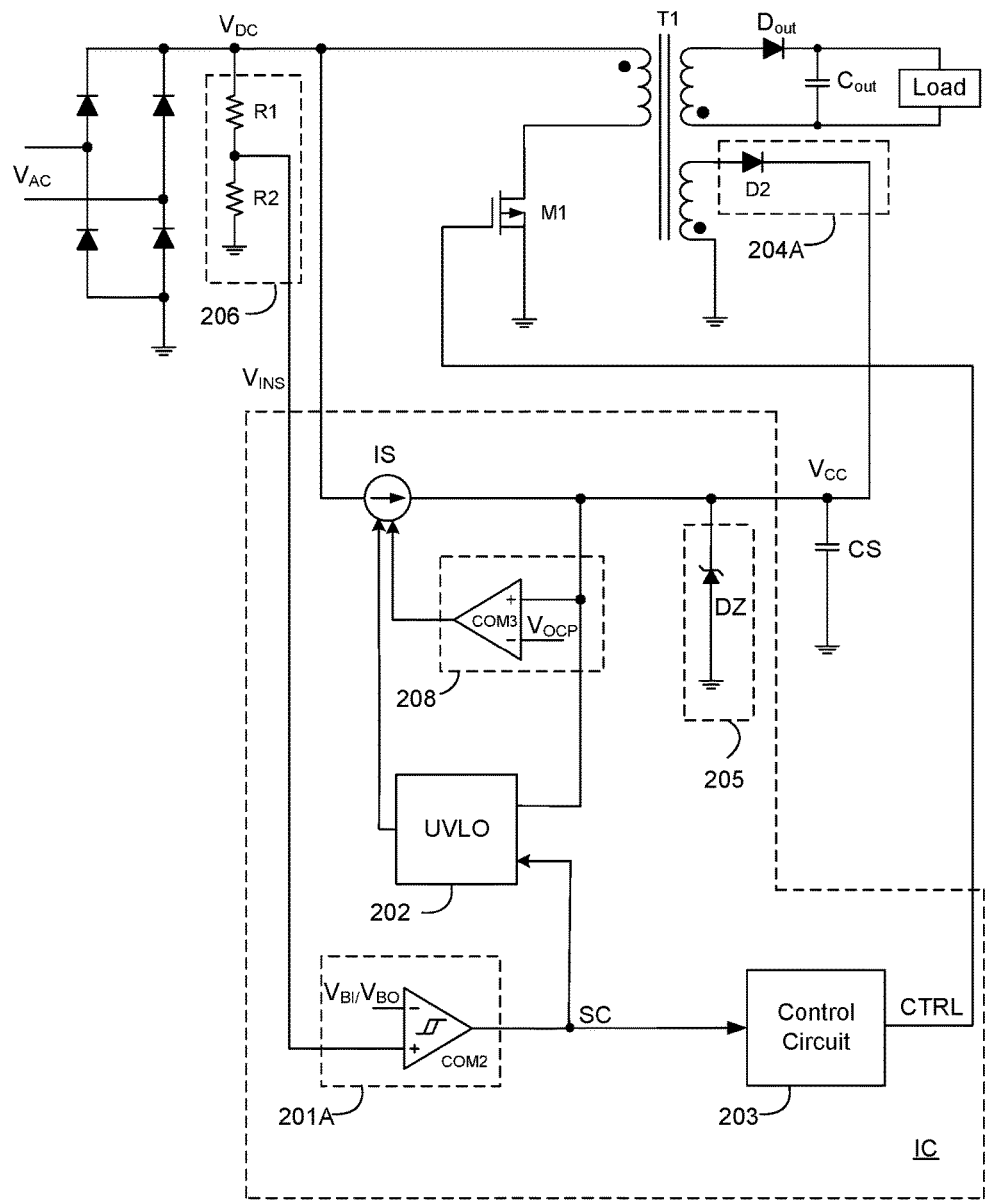
FIG. 5 schematically illustrates a switching converter in accordance with another embodiment of the present invention.

FIG. 5 schematically illustrates a switching converter in accordance with another embodiment of the present invention. In the embodiment shown in FIG. 5, the power supply circuit further comprises a short-circuit protection circuit 208. The short-circuit protection circuit 208 comprises a comparator COM3 having an input terminal coupled to receive the power supply voltage $V_{CC}$, and an output terminal. The comparator COM3 is configured to compare the power supply voltage $V_{CC}$ with a short-circuit threshold voltage $V_{OCP}$ and generates a comparing control signal at the output terminal. When the power supply voltage $V_{CC}$ is higher than the short-circuit threshold voltage $V_{OCP}$, the lock out signal LOCK provided by the UVLO unit 202 is used to control the current source IS to provide the power supply voltage $V_{CC}$ by charging the power supply capacitor CS with a first current (e.g. 7 mA). When the power supply voltage $V_{CC}$ is less than the short-circuit threshold voltage $V_{OCP}$, instead of the lock out signal LOCK, the comparing control signal provided by the comparator COM3 is used to control the current source IS to provide the power supply voltage $V_{CC}$ by charging the power supply capacitor CS with a second current (e.g. 1.4 mA).

Figure 6:
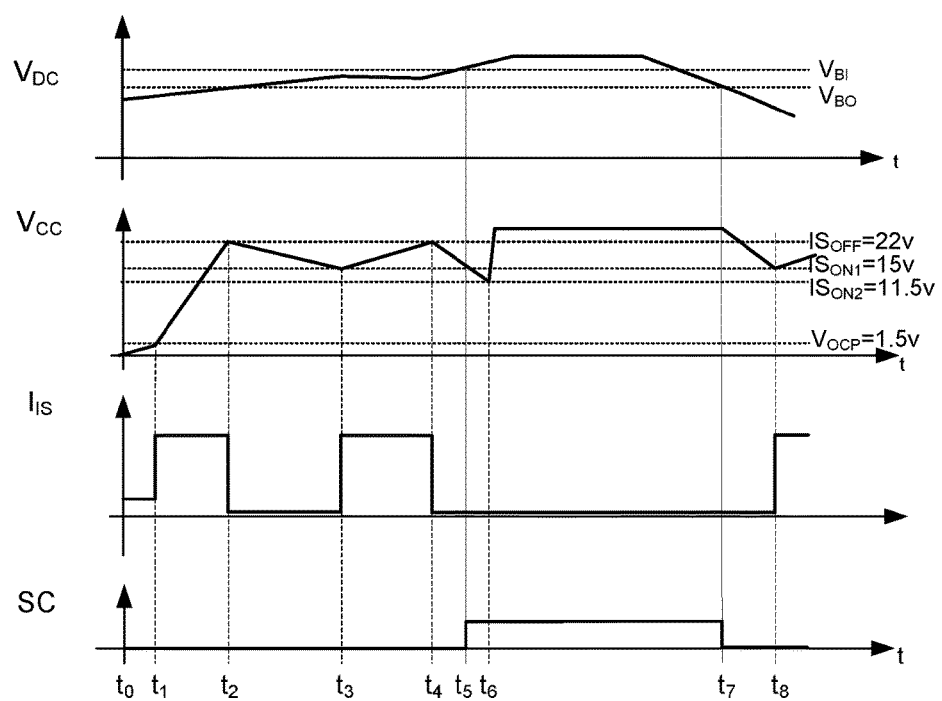
FIG. 6 illustrates working waveforms of the switching converter shown in FIG. 5 during startup of the switching converter, in accordance with an embodiment of the present invention.

FIG. 6 illustrates working waveforms of the switching converter shown in FIG. 5 during startup of the switching converter, in accordance with an embodiment of the present invention. As shown in FIG. 6, wherein $V_{DC}$ represents the DC input voltage inputted to the switching circuit 200, $V_{CC}$ represents a power supply voltage across the power supply capacitor CS, $I_{IS}$ represents a current flowing through the current source IS, SC represents the flag signal indicating whether the DC input voltage is at the brown-in state.

As shown in FIG. 6, at time t0, the switching converter just starts up, the power supply voltage $V_{CC}$ has not been built up and the switching converter is not in normal operation. From t0 to t1, the current source IS is turned ON, and the DC input voltage $V_{DC}$ is used to provide energy to the power supply capacitor CS through the current source IS. And the power supply voltage $V_{CC}$ is less than the short-circuit threshold voltage $V_{OCP}$ (e.g. 1.5V), so the current $I_{IS}$ flowing the current source IS is small, e.g. 1.4 mA, and the power supply voltage $V_{CC}$ is increased gradually.

At time t1, the power supply voltage $V_{CC}$ is increased to reach the short-circuit threshold voltage $V_{OCP}$, the current source IS is configured to provide the power supply voltage $V_{CC}$ by charging the power supply voltage $V_{CC}$ with a high current (e.g. 7 mA). At time t2, the power supply voltage $V_{CC}$ is increased to reach the upper threshold voltage $IS_{OFF}$, the current source IS is turned OFF, then a very small leakage current may be present. After time t2, the power supply voltage $V_{CC}$ starts to decrease, the protection circuit 201 starts to detect whether the DC input voltage $V_{DC}$ is at the brown-in state.

At time t3, since the DC input voltage $V_{DC}$ is not at the brown-in state, when the power supply voltage $V_{CC}$ decreases to the first value $IS_{ON1}$, the current source IS is turned ON again, and the power supply voltage $V_{CC}$ is increased gradually. The power supply voltage $V_{CC}$ is increased to the upper threshold voltage $IS_{OFF}$ at time t4, the current source IS is turned OFF. Afterward, the power supply voltage $V_{CC}$ starts to decrease.

At time t5, the DC input voltage $V_{DC}$ is increased to higher than the brown-in threshold voltage $V_{BI}$, the DC input voltage $V_{DC}$ enters into the brown-in state, the current source IS isn't turned ON until the power supply voltage $V_{CC}$ decreases to the second value $IS_{ON2}$ at t6.

At time t7, the DC input voltage $V_{DC}$ decreases to less than the brown-out threshold voltage $V_{BO}$, the DC input voltage $V_{DC}$ exits the brown-in state. The lower threshold voltage $I_{SON}$ of the power supply voltage $V_{CC}$ is changed from the second value $IS_{ON2}$ to the first value $IS_{ON1}$. At time t8, the current source IS is turned ON when the power supply voltage $V_{CC}$ decreases to the first value $IS_{ON1}$.

Figure 7:
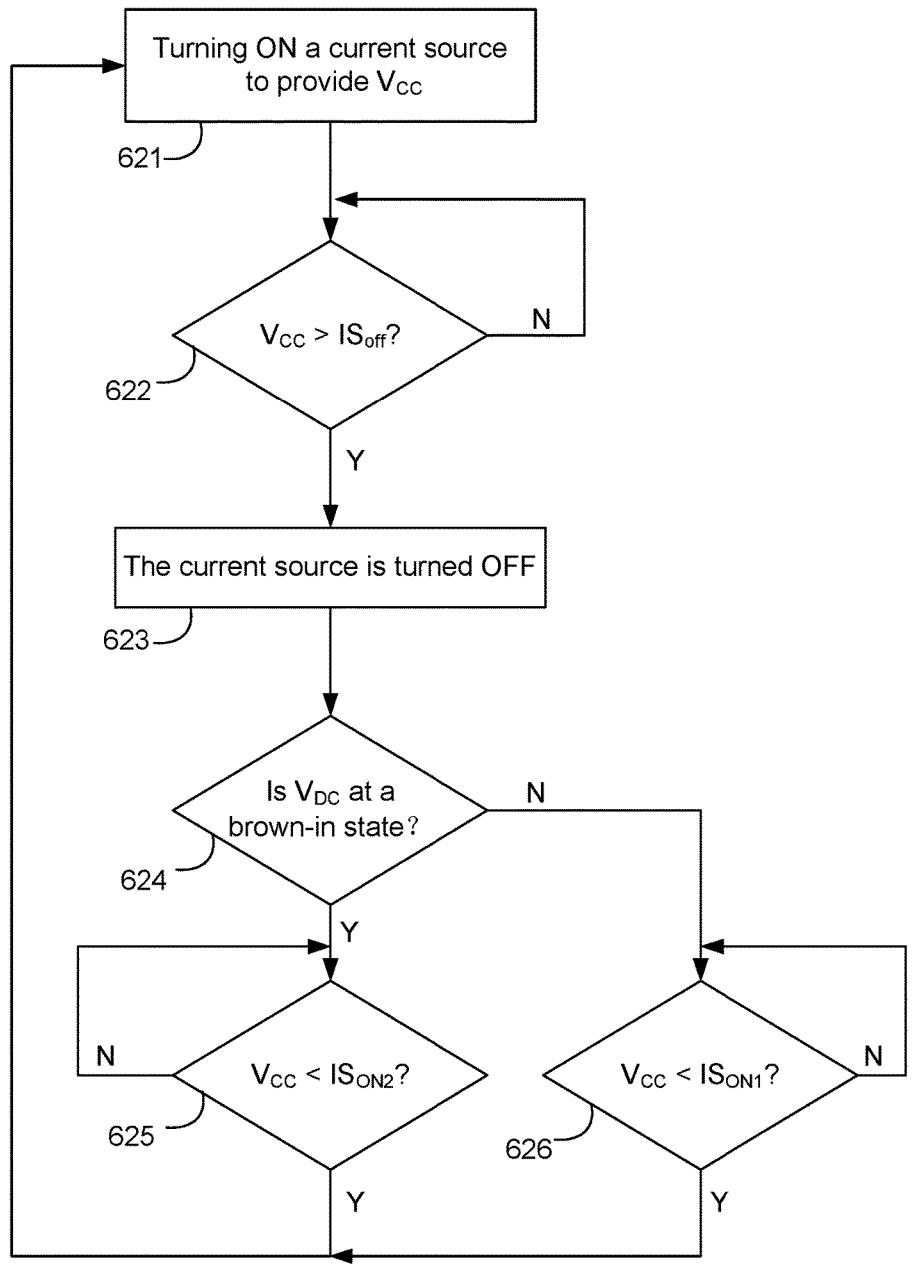
FIG. 7 illustrates a flow chart of a method for providing a power supply voltage of an integrated circuit for a switching converter during startup of the switching converter, in accordance with an embodiment of the present invention.

FIG. 7 illustrates a flow chart of a method for providing a power supply voltage of an integrated circuit for a switching converter during startup of the switching converter, in accordance with an embodiment of the present invention. The switching converter comprises a switching circuit configured to convert a DC input voltage into an output signal and a power supply capacitor configured to provide the power supply voltage, and wherein the switching circuit has at least one switch, the method comprises steps S621~S625.

At step S621, a current source coupled to the power supply capacitor is turned ON to charge the power supply capacitor for providing the power supply voltage $V_{CC}$.

At step S622, whether the power supply voltage $V_{CC}$ is increased to reach a upper threshold voltage $IS_{OFF}$ is detected.

At step S623, the current source is turned OFF when the power supply voltage $V_{CC}$ is increased to reach the upper threshold voltage $IS_{OFF}$.

At step S624, whether the DC input voltage $V_{DC}$ is at a brown-in state is detected.

At step S625, whether the power supply voltage $V_{CC}$ is decreased to reach a lower threshold voltage $IS_{ON2}$ is detected when the DC input voltage $V_{DC}$ is at the brown-in state. If yes, turn to the step S621.

At step S625, whether the power supply voltage $V_{CC}$ is decreased to reach a lower threshold voltage $IS_{ON1}$ is detected when the DC input voltage $V_{DC}$ is not at the brown-in state. If yes, turn to the step S621.

The above steps are repeated until the startup of the switching converter finishes. In one embodiment, the switching converter further comprises an auxiliary power supply circuit. When the switching converter just starts up, the power supply voltage $V_{CC}$ has not been built up and the switching circuit is not in normal operation. The current source is used to provide energy for the power supply capacitor. After the startup of the switching converter has been finished, the switching circuit starts to work. The auxiliary power supply circuit is mainly used to provide energy to the power supply capacitor CS instead of the current source.

Figure 8:
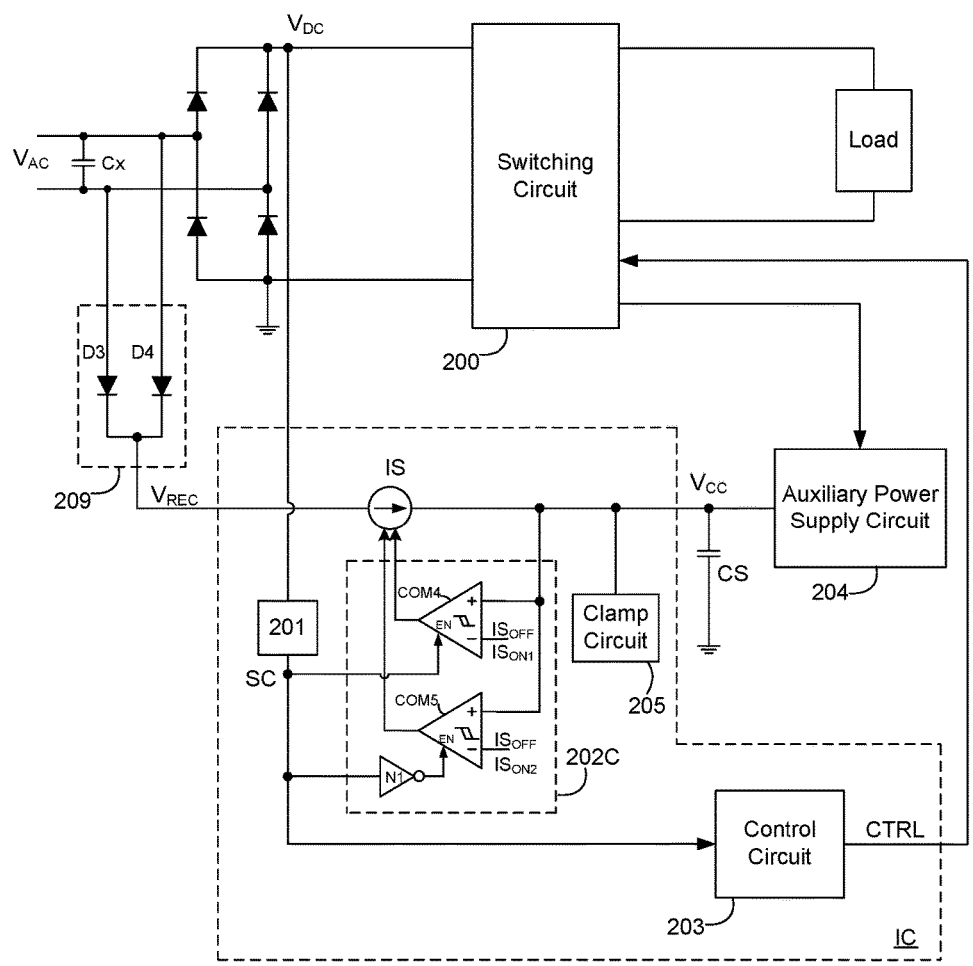
FIG. 8 schematically illustrates a switching converter, in accordance with another embodiment of the present invention.

FIG. 8 schematically illustrates a switching converter, in accordance with another embodiment of the present invention. The switching converter shown in FIG. 8 further comprises an EMI filter capacitor $C_X$ and a rectifying circuit 209. The existence of the rectifying circuit 209 can reduce the number of the high voltage devices in a discharge circuit for discharging the capacitor $C_X$. The rectifying circuit 209 has a first input terminal and a second input terminal configured to receive an AC input voltage $V_{AC}$ and an output terminal configured to provide a rectifying signal $V_{REC}$. The rectifying circuit 209 comprises a diode D3 and a diode D4. The current source IS has an input terminal coupled to the output terminal of the rectifying circuit 209, an output terminal coupled to the power supply capacitor CS to provide the power supply voltage $V_{CC}$, and a control terminal coupled to the output terminal of the UVLO unit 202C.

In the embodiment shown in FIG. 8, the UVLO unit 202C comprises a first hysteresis comparator COM4 and a second hysteresis comparator COM5. The first hysteresis comparator COM1 has a non-inverting input terminal, an inverting input terminal, an enable terminal and an output terminal, wherein the non-inverting input terminal is coupled to receive the power supply voltage $V_{CC}$, the inverting input terminal is coupled to receive the upper threshold voltage $IS_{OFF}$ and the first value $IS_{ON1}$ as the lower threshold voltage $IS_{ON}$ of the power supply voltage $V_{CC}$, the enable terminal is coupled to the protection circuit 202 to receive the flag signal SC, the output terminal is coupled to the control terminal of the current source IS to provide the lock out signal LOCK. The second hysteresis comparator COM5 has a non-inverting input terminal, an inverting input terminal, an enable terminal and an output terminal, wherein the non-inverting input terminal is coupled to receive the power supply voltage $V_{CC}$, the inverting input terminal is coupled to receive the upper threshold voltage $IS_{OFF}$ and the second value $IS_{ON1}$ as the lower threshold voltage $IS_{ON}$ of the power supply voltage $V_{CC}$, the enable terminal is coupled to receive the flag signal SC through an inverter N1, and the output terminal is coupled to the control terminal of the current source IS to provide the lock out signal LOCK. In yet another embodiment, the UVLO unit 202C may comprise a plurality of comparators and logic gate circuits.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. An integrated circuit for a switching converter, wherein the switching converter comprises a switching circuit and a power supply capacitor configured to provide a power supply voltage for the integrated circuit, and wherein the switching circuit having at least one switch is configured to convert a DC input voltage into an output signal through an ON and OFF switching of the at least one switch, the integrated circuit comprising:
   a power supply circuit coupled to the power supply capacitor and configured to provide the power supply voltage, comprising:
      a protection circuit configured to detect whether the DC input voltage is at a brown-in state, and having an output terminal configured to generate a flag signal based on the detection;
      an under voltage lock out (UVLO) unit, having a first input terminal coupled to receive the power supply voltage, a second input terminal coupled to receive the flag signal, and an output terminal configured to generate a lock out signal by comparing the power supply voltage with an upper threshold voltage and a lower threshold voltage, wherein the flag signal is used to selectively limit the lower threshold voltage of the power supply voltage to one of a first value or a second value, wherein the second value is less than the first value;
      a current source, having an input terminal coupled to the DC input voltage, an output terminal coupled to the power supply capacitor to provide the power supply voltage, and a control terminal coupled to the output terminal of the UVLO unit; and
   a control circuit coupled to the output terminal of the protection circuit and the at least one switch and configured to generate a control signal to control the at least one switch.

2. The integrated circuit of claim 1, wherein the protection circuit comprises:
   a first hysteresis comparator, having a non-inverting input terminal coupled to receive the DC input voltage, an inverting input terminal coupled to receive a brown-in threshold voltage and a brown-out threshold voltage, and an output terminal configured to generate the flag signal based on the DC input voltage and the brown-in threshold voltage and the brown-out threshold voltage, wherein after when the DC input voltage is increased to reach the brown-in threshold voltage and before when the DC input voltage is decreased to reach the brown-out threshold voltage, the DC input voltage is at the brown-in state, the flag signal is at a first logic state, otherwise, the DC input voltage is NOT at the brown-in state, the flag signal is at a second logic state.

3. The integrated circuit of claim 1, wherein:
   when the DC input voltage is NOT at the brown-in state, the flag signal is configured to select the first value as the lower threshold voltage of the power supply voltage; and
   when the DC input voltage is at the brown-in state, the flag signal is configured to change the lower threshold voltage of the power supply voltage from the first value to the second value.

4. The integrated circuit of claim 1, wherein the UVLO unit comprises:
a selection circuit having an input terminal coupled to receive the flag signal, the selection circuit is configured to select one of the first value and the second value as the lower threshold voltage of the power supply voltage based on the flag signal; and
a first hysteresis comparator, having a non-inverting input terminal coupled to receive the power supply voltage, an inverting input terminal coupled to receive the upper threshold voltage and the lower threshold voltage selected by the selection circuit, and an output terminal coupled to the control terminal of the current source to provide the lock out signal.

5. The integrated circuit of claim 1, wherein the UVLO unit comprises:
a first hysteresis comparator, having a non-inverting input terminal coupled to receive the power supply voltage, an inverting input terminal coupled to receive the upper threshold voltage and the first value as the lower threshold voltage, an enable terminal coupled to receive the flag signal, and an output terminal coupled to the control terminal of the current source to provide the lock out signal; and
a second hysteresis comparator, having a non-inverting input terminal coupled to receive the power supply voltage, an inverting input terminal coupled to receive the upper threshold voltage and the second value as the lower threshold voltage, an enable terminal coupled to receive the flag signal through an inverter, and an output terminal coupled to the control terminal of the current source to provide the lock out signal.

6. A switching converter having an input terminal coupled to an output terminal of a rectifier bridge and an output terminal, wherein the rectifier bridge is configured to convert an AC input voltage into a DC input voltage, the switching converter comprising:
a switching circuit with at least one switch, configured to convert the DC input voltage into an output signal through an ON and OFF switching of the at least one switch;
a power supply capacitor configured to provide a power supply voltage for an integrated circuit;
the integrated circuit, comprising:
a power supply circuit coupled to the power supply capacitor and configured to provide the power supply voltage, comprising:
a protection circuit configured to detect whether the DC input voltage is at a brown-in state, and having an output terminal configured to generate a flag signal based on the detection;
an UVLO unit, having a first input terminal coupled to receive the power supply voltage, a second input terminal coupled to receive the flag signal, and an output terminal configured to generate a lock out signal by comparing the power supply voltage with an upper threshold voltage and a lower threshold voltage, wherein the flag signal is used to selectively limit the lower threshold voltage of the power supply voltage to one of a first value or a second value, wherein the second value is less than the first value;
a current source, having an input terminal coupled to the DC input voltage, an output terminal coupled to the power supply capacitor to provide the power supply voltage, and a control terminal coupled to the output terminal of the UVLO unit; and
a control circuit coupled to the output terminal of the protection circuit and the at least one switch and configured to generate a control signal to control the at least one switch.

7. The switching converter of claim 6, wherein the protection circuit comprises:
a first hysteresis comparator having a non-inverting input terminal coupled to receive the DC input voltage, an inverting input terminal coupled to receive a brown-in threshold voltage and a brown-out threshold voltage, and an output terminal configured to generate the flag signal based on the DC input voltage and the brown-in threshold voltage and the brown-out threshold voltage, wherein after when the DC input voltage is increased to reach the brown-in threshold voltage and before when the DC input voltage is decreased to reach the brown-out threshold voltage, the DC input voltage is at the brown-in state, the flag signal is at a first logic state, otherwise, the DC input voltage is NOT at the brown-in state, the flag signal is at a second logic state.

8. The switching converter of claim 6, wherein the switching converter further comprises:
an input voltage dividing circuit, having an input terminal coupled to receive the DC input voltage and an output terminal configured to generate a voltage sensing signal.

9. The switching converter of claim 8, wherein the protection circuit comprises:
a first hysteresis comparator having a non-inverting input terminal coupled to receive the voltage sensing signal, an inverting input terminal coupled to receive a brown-in threshold voltage and a brown-out threshold voltage, and an output terminal configured to generate the flag signal based on the voltage sensing signal and the brown-in threshold voltage and the brown-out threshold voltage, wherein after when the voltage sensing signal is increased to reach the brown-in threshold voltage and before when the voltage sensing signal is decreased to reach the brown-out threshold voltage, the DC input voltage is at the brown-in state, the flag signal is at a first logic state, otherwise, the DC input voltage is NOT at the brown-in state, the flag signal is at a second logic state.

10. The switching converter of claim 6, wherein:
when the DC input voltage is NOT at the brown-in state, the flag signal is configured to select the first value as the lower threshold voltage of the power supply voltage; and
when the DC input voltage is at the brown-in state, the flag signal is configured to change the lower threshold voltage of the power supply voltage from the first value to the second value.

11. The switching converter of claim 6, wherein the UVLO unit comprises:
a selection circuit having an input terminal coupled to receive the flag signal, the selection circuit is configured to select one of the first value and the second value as the lower threshold voltage of the power supply voltage based on the flag signal; and
a first hysteresis comparator, having a non-inverting input terminal coupled to receive the power supply voltage, an inverting input terminal coupled to receive the upper threshold voltage and the lower threshold voltage selected by the selection circuit, and an output terminal coupled to the control terminal of the current source to provide the lock out signal.

12. The switching converter of claim 6, wherein the UVLO unit comprises:
- a first hysteresis comparator, having a non-inverting input terminal coupled to receive the power supply voltage, an inverting input terminal coupled to receive the upper threshold voltage and the first value as the lower threshold voltage, an enable terminal coupled to receive the flag signal, and an output terminal coupled to the control terminal of the current source to provide the lock out signal; and
- a second hysteresis comparator, having a non-inverting input terminal coupled to receive the power supply voltage, an inverting input terminal coupled to receive the upper threshold voltage and the second value as the lower threshold voltage, an enable terminal coupled to receive the flag signal through an inverter, and an output terminal coupled to the control terminal of the current source to provide the lock out signal.

13. The switching converter of claim 6, further comprising:
- an auxiliary power supply circuit, having an input terminal electrically or magnetically coupled to output terminal of the switching converter and an output terminal coupled to the power supply capacitor to provide the power supply voltage after the startup of the switching converter has been finished.

14. The switching converter of claim 6, wherein:
- the switching converter further comprises a rectifying circuit having a first input terminal and a second input terminal configured to receive the AC input voltage, and an output terminal; and
- instead of coupling to the DC input voltage, the input terminal of the current source is coupled to the output terminal of the rectifying circuit.

15. A method for providing a power supply voltage of an integrated circuit for a switching converter, wherein the switching converter comprises a switching circuit configured to convert a DC input voltage into an output signal and a power supply capacitor configured to provide the power supply voltage, the method comprising:
- charging the power supply capacitor by turning-ON a current source coupled to the power supply capacitor to provide the power supply voltage;
- turning OFF the current source when the power supply voltage is increased to reach an upper threshold voltage;
- detecting whether the DC input voltage is at a brown-in state and selectively limiting a lower threshold voltage of the power supply voltage between a first value and a second value based on the detection of the brown-in state, wherein the second value is less than the first value and less than the upper threshold; and
- turning ON the current source when the power supply voltage is decreased to reach the lower threshold voltage of the power supply voltage.

16. The method of claim 15, wherein detecting whether the DC input voltage is at the brown-in state comprises:
- when the DC input voltage is increased to higher than a brown-in threshold voltage, the DC input voltage enters the brown-in state, and when the DC input voltage is decreased to less than a brown-out threshold voltage, the DC input voltage exits the brown-in state.

17. The method of claim 15, wherein:
- when the DC input voltage is not at the brown-in state, the first value is selected as the lower threshold voltage of the power supply voltage; and
- when the DC input voltage is at the brown-in state, the lower threshold voltage of the power supply voltage is changed from the first value to the second value.

18. The method of claim 15, wherein the switching converter further comprises:
- an auxiliary power supply circuit having an input terminal electrically or magnetically coupled to an output terminal of the switching circuit and an output terminal coupled to the power supply capacitor to provide the power supply voltage after the startup of the switching converter has been finished.

* * * * *